(12) United States Patent
Kimura et al.

(10) Patent No.: US 10,104,444 B2
(45) Date of Patent: Oct. 16, 2018

(54) INFORMATION PROCESSING APPARATUS, INFORMATION PROCESSING METHOD, NON-TRANSITORY COMPUTER READABLE STORAGE MEDIUM, AND DISTRIBUTION APPARATUS

(71) Applicant: YAHOO JAPAN CORPORATION, Tokyo (JP)

(72) Inventors: Kazutaka Kimura, Tokyo (JP); Junki Osanai, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days.

(21) Appl. No.: 15/015,831

(22) Filed: Feb. 4, 2016

(65) Prior Publication Data
US 2016/0277777 A1  Sep. 22, 2016

(30) Foreign Application Priority Data
Mar. 20, 2015 (JP) .................. 2015-057981

(51) Int. Cl.
*H04N 21/81* (2011.01)
*H04N 21/458* (2011.01)
(Continued)

(52) U.S. Cl.
CPC ..... *H04N 21/812* (2013.01); *H04N 21/41407* (2013.01); *H04N 21/44004* (2013.01); *H04N 21/44209* (2013.01); *H04N 21/458* (2013.01)

(58) Field of Classification Search
CPC ......... H04N 21/23424; H04N 21/2402; H04N 21/458; H04N 21/262
See application file for complete search history.

(56) References Cited

U.S. PATENT DOCUMENTS 6,237,022 B1 *  5/2001  Bruck ............... H04L 29/06
                                              709/200
6,708,213 B1 *  3/2004  Bommaiah ........ H04L 29/06
                                              370/401
(Continued)

FOREIGN PATENT DOCUMENTS

JP    H09-81455 A    3/1997
JP    2004-159057 A  6/2004
(Continued)

OTHER PUBLICATIONS

Jun. 7, 2016 Office Action issued in Japanese Patent Application No. 2015-057981.
(Continued)

*Primary Examiner* — Pankaj Kumar
*Assistant Examiner* — Charles N Hicks
(74) *Attorney, Agent, or Firm* — Oliff PLC

(57) ABSTRACT

An information processing apparatus according to an embodiment includes a speed information acquisition unit, a determination unit, and a content acquisition unit. The speed information acquisition unit acquires information on a communication speed between the information processing apparatus and a distribution apparatus distributing a video content. The determination unit determines timing of advance acquisition of the video content from the distribution apparatus based upon the information on the communication speed acquired by the speed information acquisition unit. The content acquisition unit acquires the video content in advance from the distribution apparatus at the timing of advance acquisition determined by the determination unit.

9 Claims, 11 Drawing Sheets

(51) Int. Cl.
    *H04N 21/414*    (2011.01)
    *H04N 21/44*     (2011.01)
    *H04N 21/442*    (2011.01)

(56) References Cited

U.S. PATENT DOCUMENTS

| | | | | |
|---|---|---|---|---|
| 2004/0111756 | A1* | 6/2004 | Stuckman | H04N 5/782 |
| | | | | 725/142 |
| 2013/0246582 | A1* | 9/2013 | Lee | H04L 67/02 |
| | | | | 709/219 |
| 2014/0344882 | A1* | 11/2014 | Shahmoon | H04N 21/2662 |
| | | | | 725/116 |
| 2015/0256581 | A1* | 9/2015 | Kolhi | H04L 65/602 |
| | | | | 709/219 |
| 2015/0301981 | A1* | 10/2015 | Huang | H04N 21/64784 |
| | | | | 709/213 |
| 2016/0100220 | A1* | 4/2016 | Toma | H04H 60/13 |
| | | | | 725/110 |

FOREIGN PATENT DOCUMENTS

| | | | |
|---|---|---|---|
| JP | 2011-128204 A | 6/2011 | |
| JP | 2013-057918 A | 3/2013 | |
| WO | 2007/139073 A1 | 12/2007 | |

OTHER PUBLICATIONS

Jan. 12, 2016 Office Action issued in Japanese Patent Application No. 2015-057981.

* cited by examiner

INFORMATION PROCESSING APPARATUS, INFORMATION PROCESSING METHOD, NON-TRANSITORY COMPUTER READABLE STORAGE MEDIUM, AND DISTRIBUTION APPARATUS

CROSS-REFERENCE TO RELATED APPLICATIONS

The present application claims priority to and incorporates by reference the entire contents of Japanese Patent Application No. 2015-057981 filed in Japan on Mar. 20, 2015.

BACKGROUND OF THE INVENTION

1. Field of the Invention

The present invention relates to an information processing apparatus, an information processing method, a non-transitory computer readable storage medium having stored therein an information processing program, and a distribution apparatus.

2. Description of the Related Art

For the recent years, boosting popularization of the Internet and enhancement of the distribution technology have enabled browsing a variety of contents via the Internet. For example, a large population of people browses video contents, such as movies, dramas, and the like, via the Internet.

Also, in association with the popularization of the Internet, advertisement distribution via the Internet has come to be popular; for example, it has been performed that video contents for advertisements are interpolated in contents to distribute the advertisements to people browsing the contents (e.g., see Japanese Laid-Open Patent Publication No. 2013-57918).

However, because the video contents have a greater amount of information in comparison with still contents such as texts, information acquisition does not overtake information replay and thus the video contents are not normally replayed in some communication environment.

SUMMARY OF THE INVENTION

According to one aspect of an embodiment, an information processing apparatus includes a speed information acquisition unit, a determination unit, and a content acquisition unit. The speed information acquisition unit acquires information on a communication speed between the information processing apparatus and a distribution apparatus distributing a video content. The determination unit determines timing of advance acquisition of the video content from the distribution apparatus based upon the information on the communication speed acquired by the speed information acquisition unit. The content acquisition unit acquires the video content in advance from the distribution apparatus at the timing of advance acquisition determined by the determination unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

An embodiment of an information processing apparatus, an information processing method, an information processing program, and a distribution apparatus according to the application will now be described in detail with reference to the accompanying drawings. The embodiment is not intended to limit the information processing apparatus, the information processing method, the information processing program, and the distribution apparatus according to the application.

1. INFORMATION PROCESSING METHOD

Figure 1A:
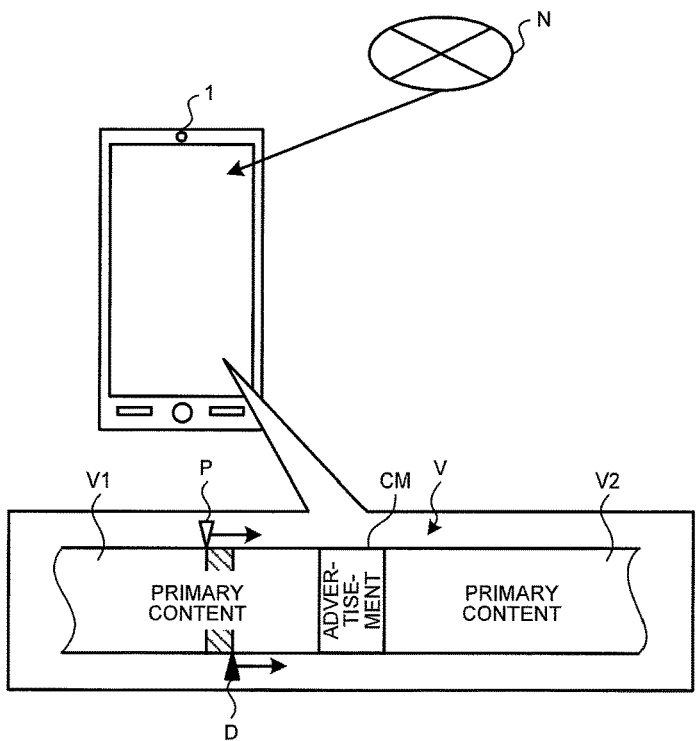
FIGS. 1A and 1B are diagrams illustrating an example of an information processing method according to an embodiment.
Figure 1B:
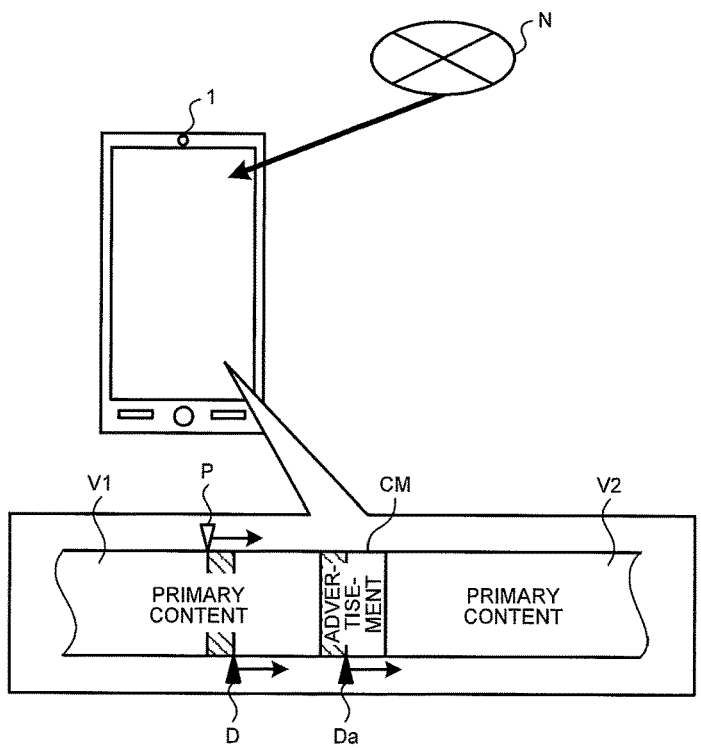

First, a method of information processing performed by an information processing apparatus 1 will be described. FIGS. 1A and 1B are diagrams illustrating an example of an information processing method according to an embodiment. In the following, described will be the information processing method in a case where the information processing apparatus 1 according to the embodiment acquires a video content V from a distribution apparatus (not illustrated) via a wireless communication network N.

Also, in the following, described will be a case where the video content V contains primary video contents V1 and V2 that are replayed time-serially and a video advertisement content (referred to simply as 'advertisement CM' hereinafter) that is interpolated between the primary contents V1 and V2. The video content V is not limited to that illustrated in FIGS. 1A and 1B but may be a video content without an advertisement CM or an advertisement CM interpolated in a web page.

A black triangle illustrated in FIG. 1A or FIG. 1B is an acquisition pointer D indexing a portion the information processing apparatus 1 is acquiring, throughout the video content V. A white triangle illustrated in FIG. 1A or FIG. 1B is a replay pointer P indexing a portion the information processing apparatus 1 is replaying, throughout the video content V. A hatched portion illustrated in FIG. 1A or FIG. 1B indicates a portion the information processing apparatus 1 is buffering, throughout the video content V.

A direction pointed by an arrow connecting the communication network N and the information processing apparatus 1 indicates a direction of distribution of the video content V. Also, a thickness of the arrow connecting the communication network N and the information processing apparatus 1 in FIG. 1A or FIG. 1B indicates a level of a communication speed between the information processing apparatus 1 and the distribution apparatus (referred to simply as 'communication speed' hereinafter) where the thicker arrow indicates an increased level of the communication speed.

As illustrated in FIG. 1A, the information processing apparatus 1 according to the embodiment is, for example, a portable hand-held terminal apparatus, such as a smartphone, that is able to acquire and replay the video content V from the distribution apparatus distributing the video content V via the communication network N. Such an information processing apparatus 1 sequentially acquires the video content V time-serially, that is, a series of the primary content V1, the advertisement CM, and the primary content V2 in this order, while it is simultaneously replaying the video content V.

To that end, in the examples illustrated in FIGS. 1A and 1B, when the information processing apparatus 1 acquires and replays the video content V, the acquisition pointer D and the replay pointer P shift from left to right as the time elapses. In these examples, although the moving speed of the replay pointer P is constant, the moving speed of the acquisition pointer D varies depending upon the communication environment of the information processing apparatus 1, namely, the communication speed between the information processing apparatus 1 and the distribution apparatus.

Thus, for example, as illustrated in FIG. 1A, when the communication speed is lower in comparison with the case illustrated in FIG. 1B, the moving speed of the acquisition pointer D is sometimes lower than the moving speed of the replay pointer P. In such a situation, the information processing apparatus 1 is prone to fail in normal replay of the advertisement CM, for example, when the acquisition pointer D, at the point of time when the acquisition pointer D has reached the position of the advertisement CM, is overtaken by the replay pointer P.

However, the communication speed of the information processing apparatus 1 is not always the same. Specifically, because the information processing apparatus 1 is a portable terminal apparatus, it often is moved from a third-generation (3G) communication environment permitting relatively low-speed communication to a fourth generation (4G) or Wireless Fidelity (Wi-Fi) communication environment permitting relatively high-speed communication, or vice versa. For this reason, the information processing apparatus 1 varies its communication speed depending upon the communication environment.

Thus, the information processing apparatus 1 acquires information on the communication speed and determines timing of advance acquisition of the video content V from the distribution apparatus based upon the acquired information on the communication speed to acquire in advance the video content V from the distribution apparatus at the determined timing of advance acquisition.

For example, as illustrated in FIG. 1B, when the communication speed becomes relatively high, the information processing apparatus 1, while acquiring and replaying the primary content V1, determines that point of time as the timing of advance acquisition of the video content V, and then, for example, acquires the advertisement CM in advance. Another black triangle indexing the position of the advertisement CM illustrated in FIG. 1B is an advance acquisition pointer Da indexing a portion the information processing apparatus 1 is acquiring in advance, throughout the video content V.

Then, when the acquisition of the advertisement CM is completed, the information processing apparatus 1 terminates the advance acquisition of the video content V indexed by the advance acquisition pointer Da. The information processing apparatus 1, while acquiring the advertisement CM, continues the ordinary acquisition of the primary content V1 indexed by the acquisition pointer D.

In this manner, even when a subsequent reduction of the communication speed might cause the acquisition pointer D to be overtaken by the replay pointer P at the point of time when the acquisition pointer D has reached the position of the advertisement CM, the information processing apparatus 1 has already acquired the advertisement CM at that point of time, and therefore, can perform normal replay of the advertisement CM that is a part of the video content V. Thus, the information processing apparatus 1 can normally replay the advertisement CM that is a part of the video content V, regardless of the communication environment.

2. CONFIGURATION OF INFORMATION PROCESSING SYSTEM

Figure 2:
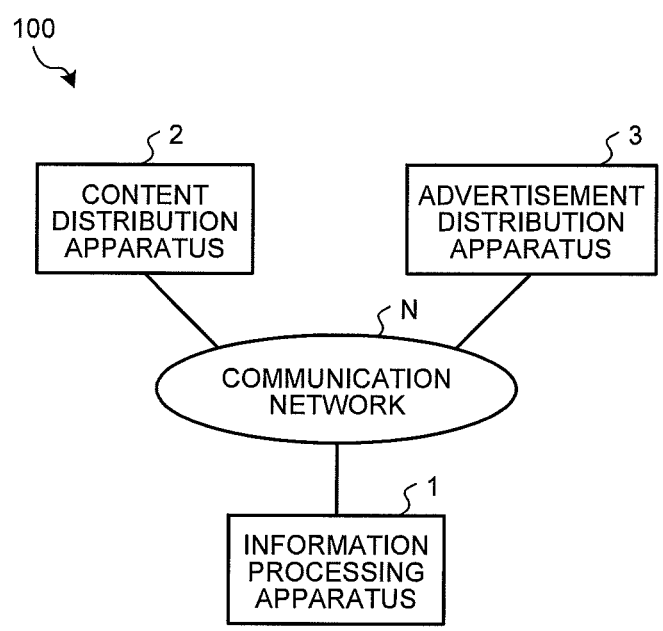
FIG. 2 is a diagram illustrating a configuration example of an information processing system according to the embodiment.

Next, with reference to FIG. 2, a configuration of an information processing system 100 according to an embodiment will be described. FIG. 2 is a diagram illustrating a configuration example of the information processing system 100 according to the embodiment. As illustrated in FIG. 2, the information processing system 100 according to the embodiment includes the information processing apparatus 1, a content distribution apparatus 2, and an advertisement distribution apparatus 3.

The information processing apparatus 1 is, as mentioned above, a hand-held wireless terminal apparatus such as a smartphone, a mobile PC (Personal Computer), or the like. The content distribution apparatus 2 is a PC, for example, and distributes a content to the information processing apparatus 1 when it acquires from the information processing apparatus 1 a browsing request for a video content such as a movie, a drama, a promotion video, or the like, or a still content such as a web page or the like.

The content distributed from the content distribution apparatus 2 to the information processing apparatus 1 contains a program that causes a browsing request for the advertisement CM to be transmitted from the information processing apparatus 1 to the advertisement distribution apparatus 3. In this manner, acquiring the content from the content distribution apparatus 2, the information processing apparatus 1 sends to the advertisement distribution apparatus 3 the browsing request for the advertisement CM and receives the advertisement distributed from the advertisement distribution apparatus 3.

The advertisement distribution apparatus 3 is a PC, for example, and distributes the advertisement CM to the information processing apparatus 1 when it acquires from the information processing apparatus 1 the browsing request for the advertisement. The information processing apparatus 1, the content distribution apparatus 2, and the advertisement distribution apparatus 3 are connected, for example, through wireless LAN (Local Area Network) communication, WAN (Wide Area Network) communication, cellular phone communication, or the like via the communication network (e.g., the Internet) and are able to bilaterally transmit various information among them.

3. CONFIGURATION OF INFORMATION PROCESSING APPARATUS

Figure 3:
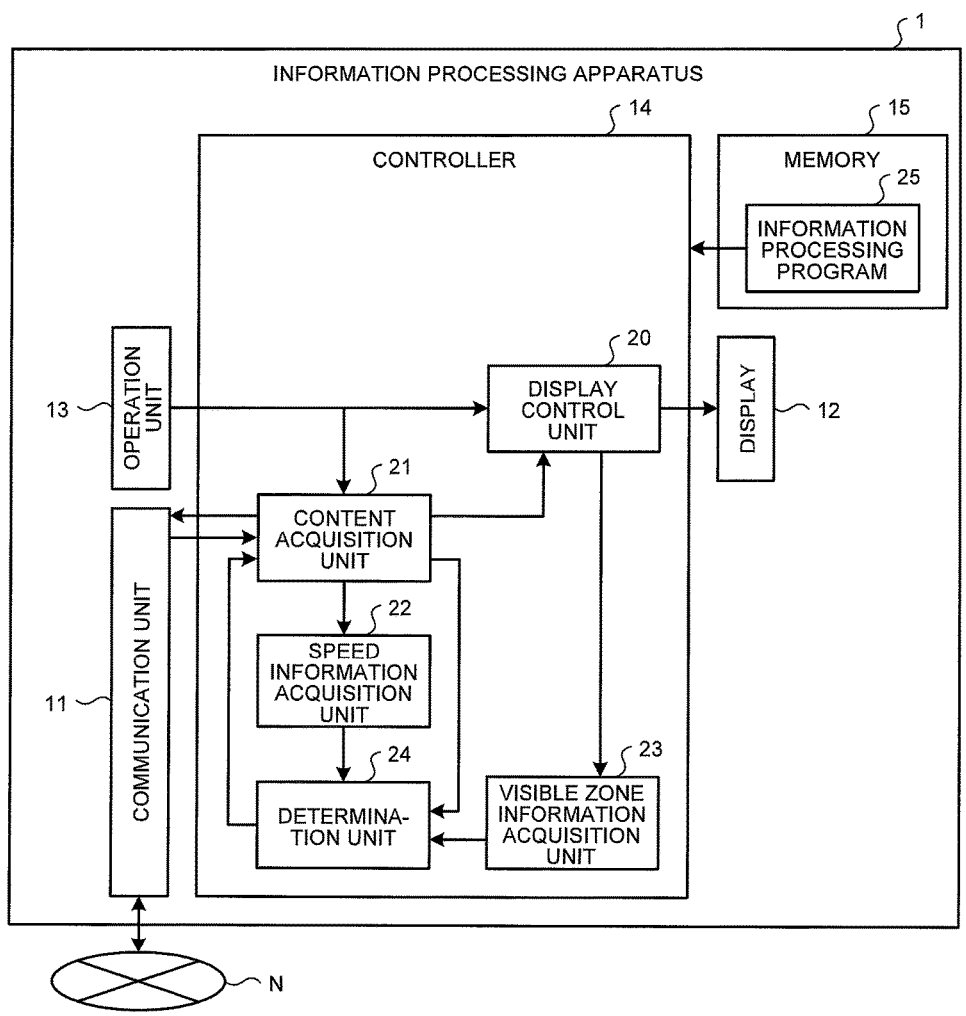
FIG. 3 is a diagram illustrating a configuration example of an information processing apparatus according to the embodiment.

Next, with reference to FIG. 3, a configuration of the information processing apparatus 1 according to the embodiment will be described. FIG. 3 is a diagram illustrating a configuration example of the information processing apparatus 1 according to the embodiment. As illustrated in FIG. 3, the information processing apparatus 1 includes the information processing apparatus 1, a communication unit 11, a display 12, an operation unit 13, a controller 14, and a memory 15.

The communication unit 11 is a communication interface that sends/receives information between the content distribution apparatus 2 and the advertisement distribution apparatus 3 via the communication network N. The display 12 is, for example, a liquid crystal display apparatus and displays pictures of operation screens for the information processing apparatus 1, the video content V and web pages received by the communication unit 11, and the like. The operation unit 13 is a touch sensor that senses a touching operation on the display 12 by a user, and outputs signals according to the touching operation when the touching operation is accepted.

The memory 15 is, for example, an information storage device such as a RAM (Random Access Memory), a flash memory, a hard disk, or the like. The memory 15 stores an information processing program 25. The information processing program 25 is a program that the controller 14 executes when the video content V and web pages are acquired and replayed, based upon the signals input from the operation unit 13.

The controller 14 is a processing unit that governs and controls the whole of the information processing apparatus 1 and is implemented, for example, by an integrated circuit such as an ASIC (Application Specific Integrated Circuit), an FPGA (Field Programmable Gate Array), or the like.

The controller 14 includes a plurality of information processing units that function when an internal CPU (Central Processing Unit) or an MPU (Micro Processing Unit) reads the information processing program 25 from the memory 15 and executes it by using a RAM as a work area.

Specifically, the controller 14 includes a display control unit 20, a content acquisition unit 21, a speed information acquisition unit 22, a visible zone information acquisition unit 23, and a determination unit 24. An inner arrangement of the controller 14 is not limited to such, but may be replaced with any other arrangement performing the information processing mentioned later.

The display control unit 20 is a processing unit that controls operation of the display 12 based upon the signals corresponding to the touching operation input from the operation unit 13 and causes the video content V input from the content acquisition unit 21 to be replayed or stopped, web pages to be displayed and scrolled, and so forth.

The content acquisition unit 21 is a processing unit that acquires contents such as the video content V, web pages, and the like from the content distribution apparatus 2 and the advertisement distribution apparatus 3 via the communication network N. The content acquisition unit 21 sends a browsing request for the video content V or a web page to the content distribution apparatus 2 and the advertisement distribution apparatus 3, for example, when the content acquisition unit 21 receives a signal input from the operation unit 13, the signal indicating that the user has operated the content acquisition unit 21 to acquire the content.

The content acquisition unit 21 acquires the video content V or the web page content from the content distribution apparatus 2 and the advertisement distribution apparatus 3 and outputs the acquired content to the display control unit 20. Also, the content acquisition unit 21 outputs the acquired video content V to the speed information acquisition unit 22 and the determination unit 24.

The content acquisition unit 21 acquires the video content V in advance from the content distribution apparatus 2 and the advertisement distribution apparatus 3 at the timing of advance acquisition of the video content V that is determined by the determination unit 24 detailed later.

The speed information acquisition unit 22 is a processing unit that acquires information on the communication speed between the information processing apparatus 1 and the content distribution apparatus 2 or the advertisement distribution apparatus 3 (referred to simply as 'communication speed' hereinafter) based upon an amount of information on the video content V input per unit period of time from the content acquisition unit 21. The speed information acquisition unit 22 outputs the acquired communication speed to the determination unit 24.

The visible zone information acquisition unit 23 is a processing unit that acquires from the display control unit 20 information indicating a position of a visible zone in a web page when the display control unit 20 causes the web page to be displayed on the display 12. The visible zone mentioned herein refers to a zone displayed on the display 12 of all over the web page. The visible zone information acquisition unit 23 outputs to the determination unit 24 the acquired information indicating the position of the visible zone.

The determination unit 24 is a processing unit that determines the timing of advance acquisition of the video content V based upon the video content V input from the content acquisition unit 21 and the communication speed input from the speed information acquisition unit 22 when the video content V is being replayed on the display 12. Also, the determination unit 24 determines the timing of advance acquisition of the advertisement CM based upon the communication speed and the information input from the visible zone information acquisition unit 23 and indicating the position of the visible zone, when the web page is being displayed on the display 12.

The determination unit 24 conducts the process of determining the timing of advance acquisition in different ways depending upon the events that the content acquisition unit 21 acquires the video content V containing the advertisement CM, that it acquires the video content V without the advertisement CM, and that it acquires a web page containing the advertisement CM, respectively. Thus, the determination unit 24 outputs to the content acquisition unit 21 information indicating the determined timing of advance acquisition (referred to simply as 'timing of advance acquisition' hereinafter).

4. OPERATION OF INFORMATION PROCESSING APPARATUS

Next, with reference to FIG. 4A to FIG. 6B, examples of the operation of the information processing apparatus 1 will be described. FIG. 4A to FIG. 6B are diagrams illustrating operation examples of the information processing apparatus 1. FIGS. 4A to 4E illustrate an example of the operation of the information processing apparatus 1 when the content acquisition unit 21 acquires the video content V containing the advertisement CM.

Figure 4A:
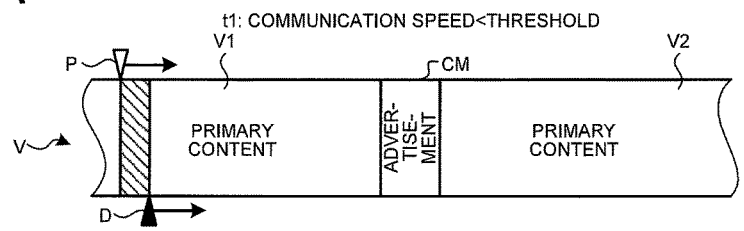
FIGS. 4A to 4E are diagrams illustrating an operation example of the information processing apparatus according to the embodiment.
Figure 4B:
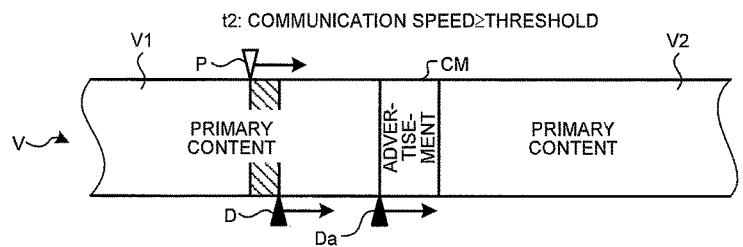
Figure 4C:
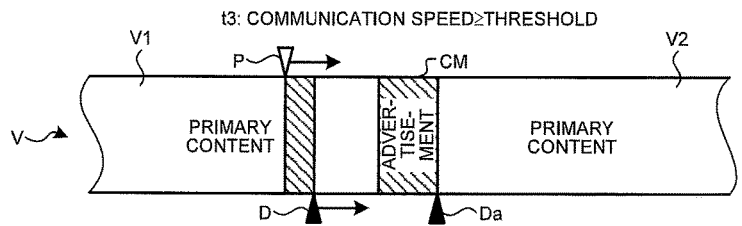
Figure 4D:
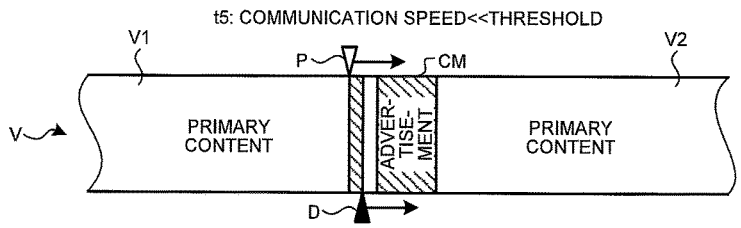
Figure 4E:
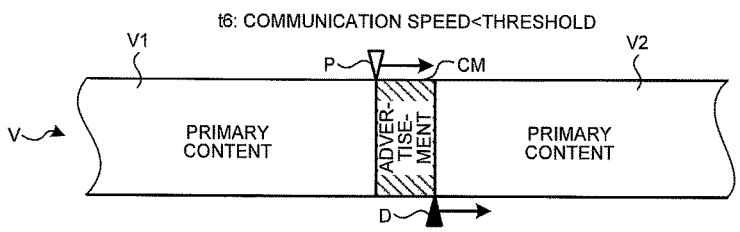
Figure 5A:
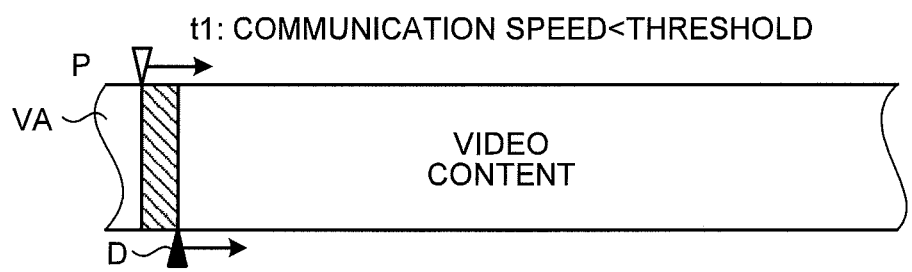
FIGS. 5A and 5B are diagrams illustrating an operation example of the information processing apparatus according to the embodiment.
Figure 5B:
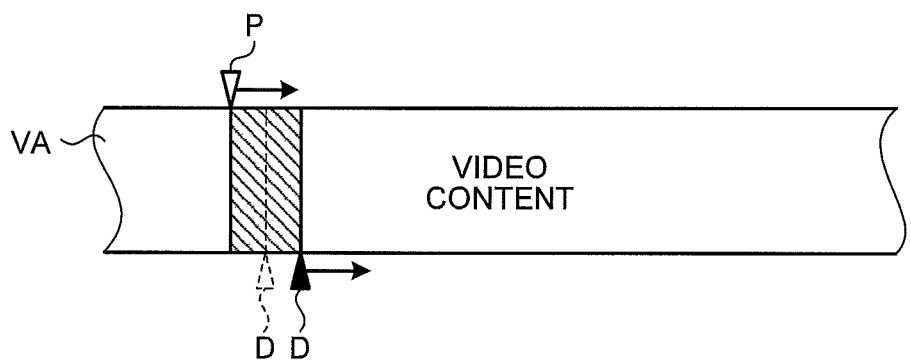
Figure 6A:
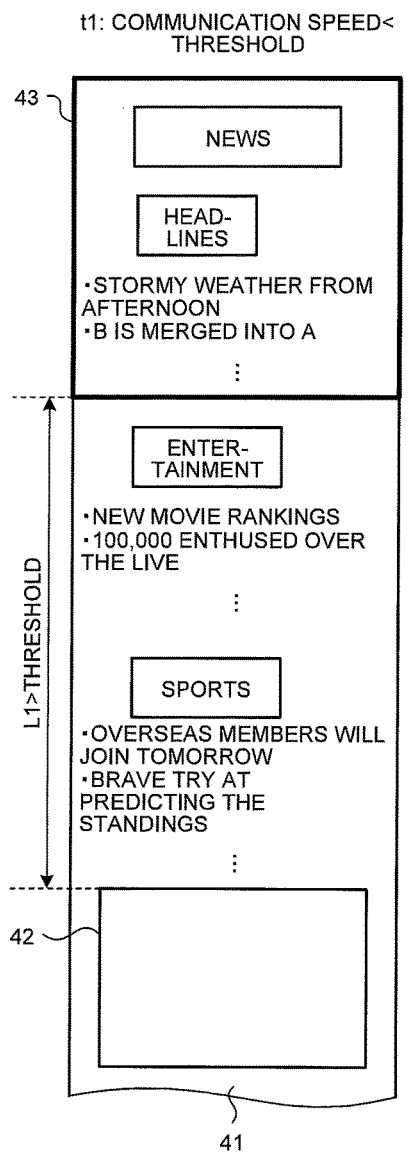
FIGS. 6A and 6B are diagrams illustrating an operation example of the information processing apparatus according to the embodiment.
Figure 6B:
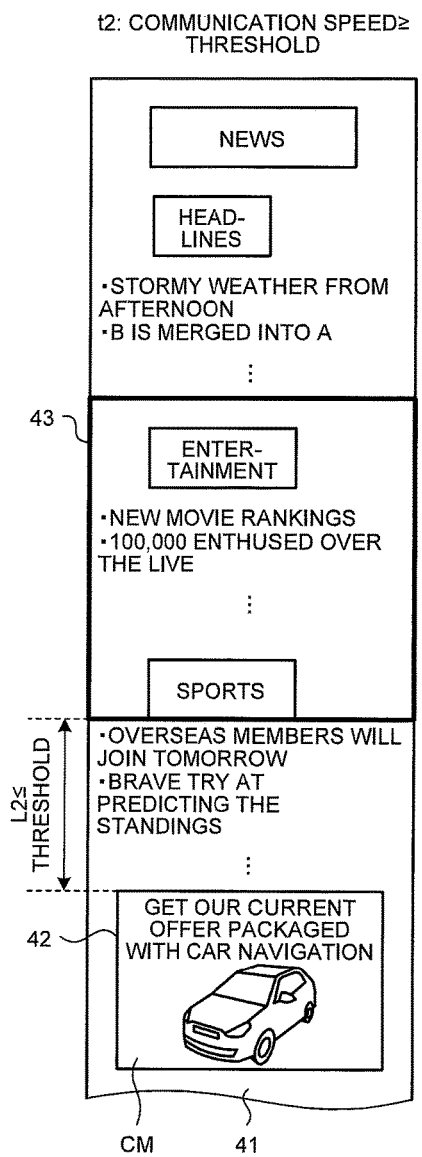

Additionally, FIGS. 5A and 5B illustrate an example of the operation of the information processing apparatus 1 when the content acquisition unit 21 acquires a video content without the advertisement CM. Further, FIGS. 6A and 6B illustrate an example of the operation of the information processing apparatus 1 when the content acquisition unit 21 acquires the web page containing the advertisement CM. Components illustrated in FIGS. 4A to 4E and FIGS. 5A and 5B and equivalent to those illustrated in FIGS. 1A and 1B are denoted by the same reference symbols as those used for the equivalents in FIGS. 1A and 1B, and thereby, the description of such components is omitted.

As illustrated in FIG. 4A, the information processing apparatus 1 sometimes acquires the video content V with the advertisement CM interpolated between the primary contents V1 and V2 when the communication speed is lower than the threshold at a point of time t1. The threshold is a communication speed, for example, at which the moving speeds of the replay pointer P and the acquisition pointer D are the same.

In such a situation, as illustrated in FIG. 4A, the information processing apparatus 1 starts acquisition of the primary content V1, and then it starts replay of the primary content V1 after buffering the primary content V1 by a predetermined amount of the information.

After that, the information processing apparatus 1 concurrently acquires and replays the primary content V1 while displacing the acquisition pointer D and the replay point P at their respective default moving speeds in a direction of replay (from left to right in FIGS. 4A to 4E). The default moving speed of the acquisition pointer D may be equal to or greater than the moving speed of the replay pointer P, and the following discussion is on the assumption that it is identical with the moving speed of the replay pointer P.

After that, as illustrated in FIG. 4B, when the communication speed is equal to or greater than the threshold at a point of time t2, the information processing apparatus 1, while acquiring and replaying the primary content V1, conducts advance acquisition (prior reading) of the advertisement CM. Specifically, timing when the primary content has been being replayed and the communication speed has become equal to or greater than the threshold is determined as the timing of advance acquisition of the advertisement CM, and the advance acquisition pointer Da is set to a point to start the advertisement CM throughout the video content V.

Then, the information processing apparatus 1 displaces the acquisition pointer D, the replay pointer P, and the advance acquisition pointer Da in the direction of replay. In this manner, the information processing apparatus 1, while acquiring and replaying the primary content V1, acquires the advertisement CM in advance.

In this way, the information processing apparatus 1, as illustrated in FIG. 4C, completes the advance acquisition of the advertisement CM at a point of time t3. Then, having completed the advance acquisition of the advertisement CM, the information processing apparatus 1, while continuing to acquire and replay the primary content V1, terminates the advance acquisition of the video content V conducted by shifting the advance acquisition pointer Da.

In acquiring the advertisement CM in advance, not necessarily the entire piece of the advertisement CM has to be acquired. The information processing apparatus 1 may terminate the advance acquisition of the advertisement CM at a point of time when an introductory portion of the advertisement CM has been acquired subsequent to the determined timing of advance acquisition. The introductory portion in this situation refers to a portion corresponding to approximately 5- to 15-second replay from the beginning of the advertisement CM as to the advertisement CM of which total replay time is 30 seconds, for example.

After that, as illustrated in FIG. 4D, when the communication speed becomes significantly lower than the threshold at a point of time t5, the moving speed of the acquisition pointer D rapidly drops and sometimes lets the replay pointer P come close, and yet, the information processing apparatus 1 has already acquired the advertisement CM at this point of time.

In this manner, even when subsequently the replay pointer P overtakes the acquisition pointer D at the point of time when the replay pointer P has reached the leading end position of the advertisement CM, the information processing apparatus 1 has already acquired the advertisement CM, and therefore, is able to normally replay the advertisement CM.

After that, as illustrated in FIG. 4E, when the replay pointer P reaches the leading end position of the advertisement CM at a point of time t6, the information processing apparatus 1 shifts the acquisition pointer D to the trailing end position of the advertisement CM and then displaces it in the direction of replay of the video content V.

In this manner, the information processing apparatus 1 can acquire the primary content V2 while it is replaying the advertisement CM, and hence, when the replay of the advertisement CM is completed, the primary content V2 can be normally replayed.

Also, as illustrated in FIG. 5A, for example, when the communication speed is lower than the threshold at the point of time t1, the information processing apparatus 1 sometimes acquires a video content VA without the advertisement CM. In such a situation, when the communication speed becomes equal to or greater than the threshold, because an allowance of communication band is made, the information processing apparatus 1 determines a timing before the ordinary timing of acquisition of the video content VA as the timing of advance acquisition of the video content VA, and the information processing apparatus 1 acquires the video content V in advance at the determined timing of advance acquisition.

In this manner, as illustrated in FIG. 5B, at the point of time t2 after the communication speed becomes equal to or greater than the threshold, the information processing apparatus 1 can displace the acquisition pointer D to a position ahead of the position as it indexes to when the video content VA is acquired at the ordinary timing of acquisition, as illustrated by broken line. In other words, the information processing apparatus 1 can acquire the video content VA earlier and greater in amount to buffer it, compared with the acquisition of the video content VA at the ordinary timing of acquisition.

Thus, even when the communication speed becomes significantly lower than the threshold subsequently, the acquisition of the video content VA at the ordinary timing of acquisition may be enough to normally reply the video content VA, even in such a situation where the replay pointer P overtakes the acquisition pointer D.

In some other case, as illustrated in FIG. 6A, when the communication speed is lower than the threshold, the information processing apparatus 1 acquires a web page 41 containing an advertisement frame 42 where the advertisement CM is displayed. The following discussion is by way of example and on the assumption that the web page 41 acquired by the information processing apparatus 1 is vertically elongated and carries top news, entertainment news, and sport news in the top-down order, together with the advertisement frame 42 designated at the bottom.

Acquiring the web page 41, the information processing apparatus 1 sets a visible zone 43 to a position of the headline news at the top row of the web page 41. The information processing apparatus 1 acquires the communication speed and also acquires a distance between the visible zone 43 and the advertisement frame 42 to compare the distance with a predetermined distance threshold related to the distance between the visible zone 43 and the advertisement frame 42.

At the point of time t1, as illustrated in FIG. 6A, a distance L1 between the visible zone 43 and the advertisement frame 42 is greater than the distance threshold. Hence, there is enough time for the user to scroll the web page 41 to let the advertisement frame 42 come in the visible zone 43.

Also, at the point of time t1, the communication speed is lower than a communication speed threshold, and when the advertisement CM is acquired under such circumstances, it takes increased processing time to acquire the advertisement CM while a processing load on the information processing apparatus 1 is accordingly increased.

To cope with this, the information processing apparatus 1 prohibits advance acquisition of the advertisement CM when the communication speed is lower than the communication speed threshold or when the distance L1 between the visible zone 43 and the advertisement frame 42 is greater than the distance threshold. In this manner, the web page 41 illustrated in FIG. 6A leaves the advertisement frame 42 blank.

After that, in some case, as illustrated in FIG. 6B, the user scrolls the web page 41 at the point of time t2, resulting in the advertisement frame 42 being not contained in the visible zone 43, and a distance L2 between the visible zone 43 and the advertisement frame 42 is equal to or smaller than the distance threshold while the communication speed is equal to or greater than the communication speed threshold.

In such a case, the information processing apparatus 1 is more likely to let the advertisement frame 42 come in the visible zone 43 as a result of user's scrolling the web page 41, but does not have enough time till the scrolling causes the advertisement frame 42 to come in the visible zone 43. Yet, the information processing apparatus 1 can acquire the advertisement CM in a relatively short period of time because the communication speed is equal to or greater than the communication speed threshold.

Then, the information processing apparatus 1 determines timing when the communication speed becomes equal to or greater than the communication speed threshold and the distance L2 between the visible zone 43 and the advertisement frame 42 becomes equal to or smaller than the distance threshold as the timing of advance acquisition of the advertisement CM, and acquires the advertisement CM in advance.

At this time, the information processing apparatus 1 is able to acquire the entire piece of the advertisement CM or the introductory portion of the advertisement CM in advance. In this manner, the web page 41 illustrated in FIG. 6B has the initial scene of the advertisement CM of an automobile interpolated in the advertisement frame 42.

Thus, having acquired the entire piece of the advertisement CM in advance, the information processing apparatus 1 can normally replay the entire piece of the advertisement CM from the point of time when the advertisement frame 42 has come in the visible zone 43 as a result of user's further scrolling the web page 41.

Meanwhile, having acquired the introductory portion of the advertisement CM in advance, the information processing apparatus 1, while replaying the advertisement CM, can acquire the un-acquired remaining of the advertisement CM at the point of time when the advertisement frame 42 has come in the visible zone 43 as a result of user's further scrolling the web page 41. In this manner, the information processing apparatus 1 can normally replay the entire piece of the advertisement CM similar to the case of acquiring the entire piece of the advertisement CM in advance.

Also, as illustrated above, the information processing apparatus 1 does not conduct the advance acquirement of the advertisement CM when the communication speed is lower than the communication speed threshold, and hence, it can reduce a processing load on itself. Moreover, the information processing apparatus 1 does not conduct the advance acquisition of the advertisement CM when the distance L1 between the visible zone 43 and the advertisement frame 42 is greater than the distance threshold. Thus, according to the information processing apparatus 1, for example, it is possible to prevent the user who does not scroll the web page 41 so far as the advertisement frame 42 comes in the visible zone 43 from being charged for an information communication fee for acquiring the advertisement CM he or she has not browsed.

Alternatively, the information processing apparatus 1 may be configured to determine timing when the communication speed becomes equal to or greater than the communication speed threshold as the timing of advance acquisition of the advertisement CM and acquire the advertisement CM in advance, in the event that the distance between the visible zone 43 and the advertisement frame 42 is greater than the distance threshold. Configured in such a manner, the information processing apparatus 1 can normally replay the advertisement CM at the point of time when the advertisement frame 42 has come in the visible zone 43 as a result of user's further scrolling the web page 41.

5. PROCESSES EXECUTED BY CONTROLLER OF INFORMATION PROCESSING APPARATUS

5.1. Main Process

Next, with reference to FIG. 7 to FIG. 10, processes executed by the controller 14 of the information processing apparatus 1 will be described. FIG. 7 to FIG. 10 are flow charts illustrating the processes executed by the controller 14 of the information processing apparatus 1 according to the embodiment.

Figure 7:
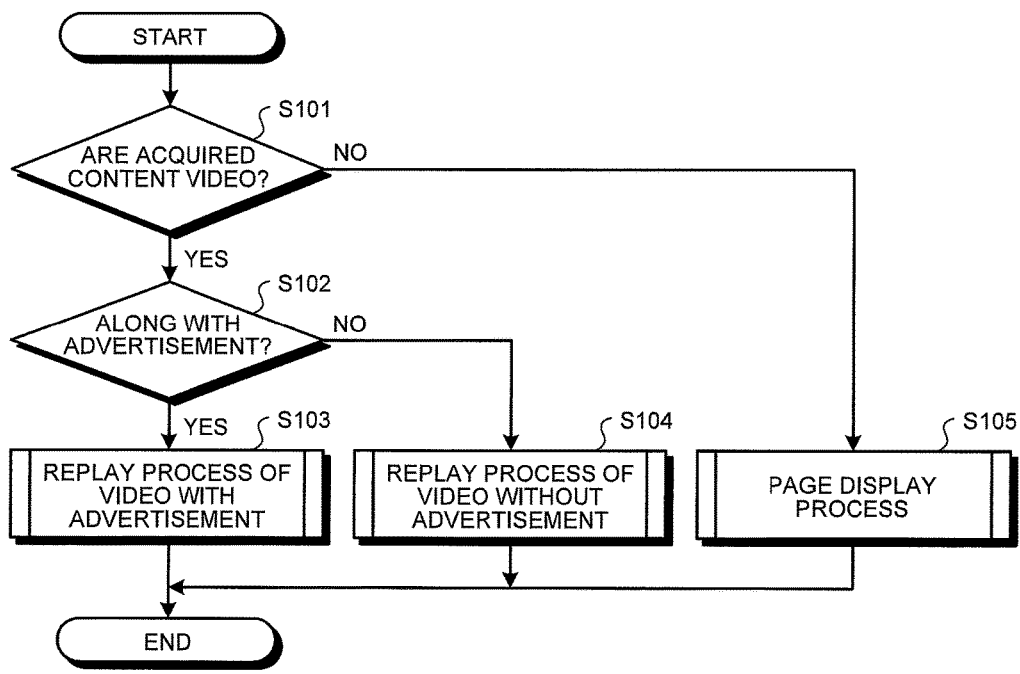
FIG. 7 is a flow chart illustrating a process executed by a controller of the information processing apparatus according to the embodiment.
Figure 8:
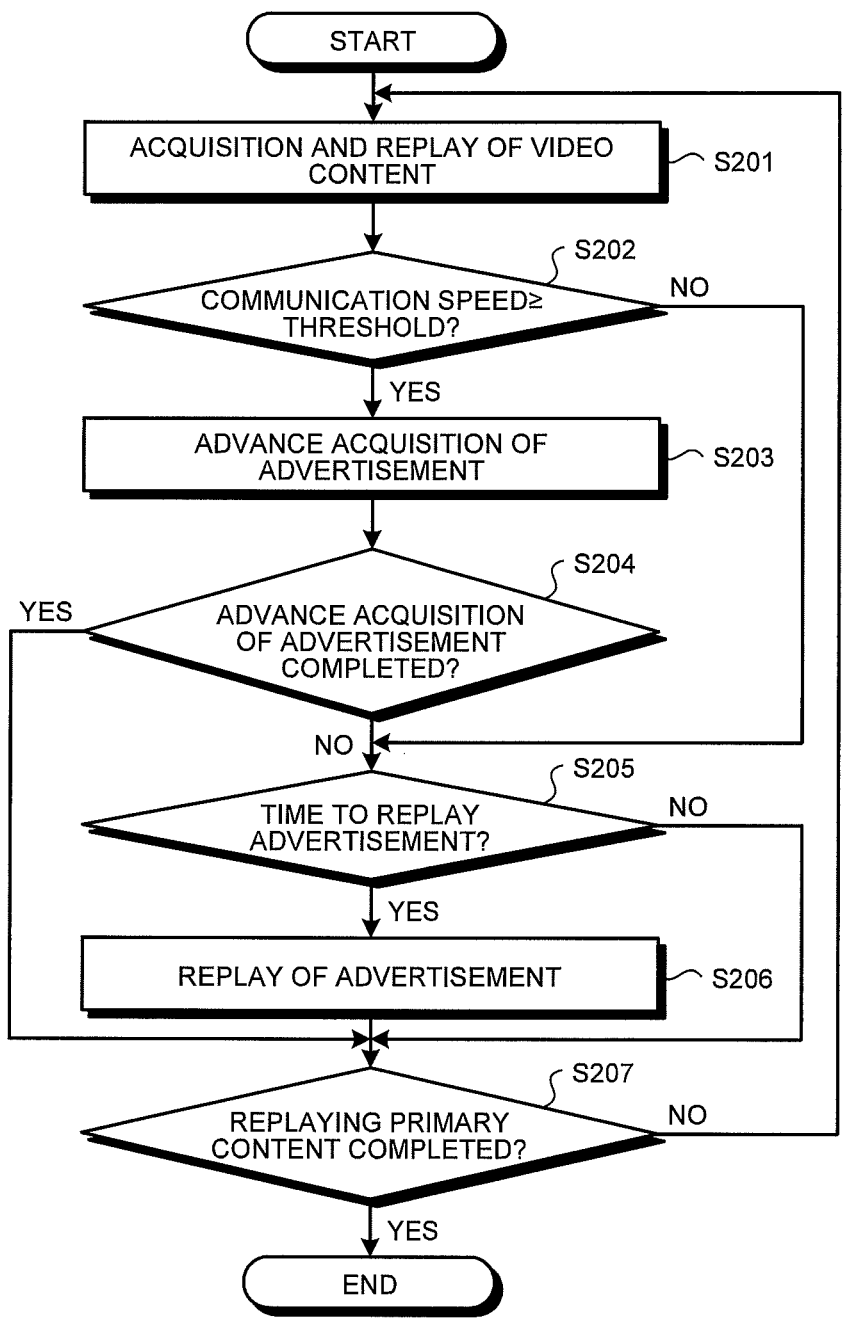
FIG. 8 is a flow chart illustrating a process executed by the controller of the information processing apparatus according to the embodiment.
Figure 9:
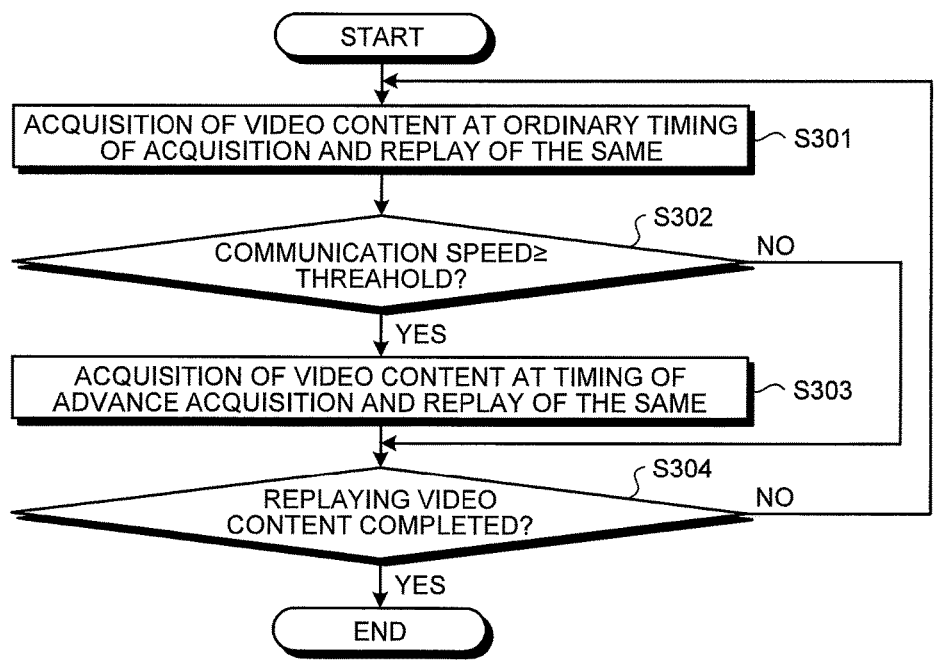
FIG. 9 is a flow chart illustrating a process executed by the controller of the information processing apparatus according to the embodiment.
Figure 10:
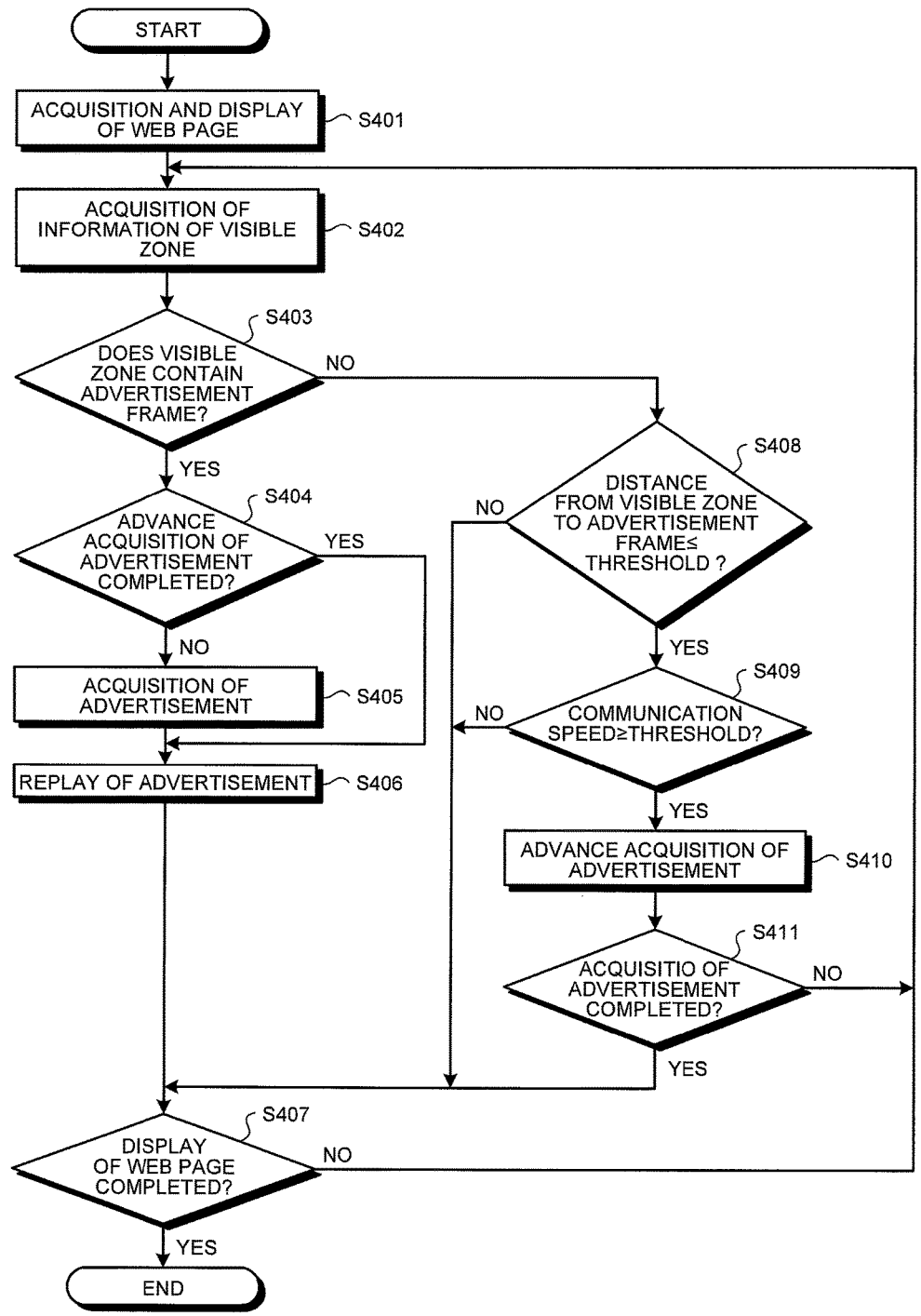
FIG. 10 is a flow chart illustrating a process executed by the controller of the information processing apparatus according to the embodiment.

FIG. 7 illustrates a main process executed by the controller 14, and FIG. 8 illustrates a process of replaying a video containing an advertisement executed by the controller 14 during the main process. FIG. 9 illustrates a process of replaying the video without an advertisement executed by the controller 14 during the main process, and FIG. 10 illustrates a page display process executed by the controller 14 during the main process.

When receiving from the operation unit 13 a signal indicating that the user has performed a content acquisition operation, the controller 14 executes the main process illustrated in FIG. 7. Upon starting the main process, the controller 14 first determines, as illustrated in FIG. 7, if the content acquired from the content distribution apparatus 2 is the video content V or not (Step S101).

When it is determined that the acquired content is the video content V (Step S101, Yes), the controller 14 proceeds with the process to Step S102. Contrarily, when it determines that the acquired content is not the video content V (Step S101, No), the controller 14 executes a page display process (Step S105) and terminates the process. The page display process will be discussed later with reference to FIG. 10.

Also, at step S102, the controller 14 determines if the acquired video content V contains an advertisement or not, and when it determines that the acquired video content V contains an advertisement (Step S102, Yes), the controller 14 executes a process of replaying a video containing an advertisement (Step S103) and terminates the process. The process of replaying a video containing an advertisement will be discussed later with reference to FIG. 8.

Meanwhile, when it is determined, at step S102, that the acquired video content is without the advertisement CM (Step S102, No), the controller 14 executes the process of replaying a video without an advertisement (Step S104) and terminates the process. The process of replaying a video without an advertisement will be discussed later with reference to FIG. 9.

5.2. Process of Replaying Video Containing Advertisement

Next, the process of replaying a video containing an advertisement executed by the controller 14 will be discussed. As illustrated in FIG. 8, starting the process of replaying a video containing an advertisement, the controller 14 first acquires the video content V from the content distribution apparatus 2 and the advertisement distribution apparatus 3 to replay it (Step S201) and determines if the communication speed is equal to or greater than the threshold or not (Step S202).

When it is determined the communication speed is not equal to or greater than the threshold (Step S202, No), the controller 14 proceeds with the process to Step S205. Contrarily, when it determines that the communication speed is equal to or greater than the threshold (Step S202, Yes), the controller 14 determines the timing of advance acquisition of the advertisement CM and acquires the advertisement CM from the advertisement distribution apparatus 3 in advance at the determined timing of advance acquisition (see FIGS. 4B and 4C) (Step S203).

After that, the controller 14 determines if the advance acquisition of the advertisement CM is completed or not (Step S204). When it is determined that the advance acquisition of the advertisement CM is completed (Step S204, Yes), the controller 14 proceeds with the process to Step S207. Contrarily, when it is determined that the advance acquisition of the advertisement CM is not completed (Step S204, No), the controller 14 proceeds with the process to Step S205.

At step S205, the controller 14 determines if it is time to replay the advertisement CM or not, and when it determines that it is time to replay the advertisement CM (Step S205, Yes), the controller 14 replays the advertisement CM (Step S206) and proceeds with the process to Step S207. Contrarily, when it determines that it is not time to replay the advertisement CM (Step S205, No), the controller 14 proceeds with the process to Step S207.

At Step S207, the controller 14 determines if the replaying of the primary contents V1 and V2 is completed or not. The controller 14 determines that the replaying of the primary contents V1 and V2 is completed when the controller 14 has replayed the primary contents V1 and V2 to their respective ends or when, in the course of replaying the primary contents V1 and V2, the controller 14 receives a signal input from the operation unit 13 and indicating that the user has operated the controller 14 to terminate the replaying.

Determining that the replaying the primary contents V1 and V2 is not completed (Step S207, No), the controller 14 proceeds with the process to Step S201. Contrarily, when it determines that the replaying the primary contents V1 and V2 is completed (Step S207, Yes), the controller 14 terminates the process.

5.3. Process of Replaying Video without Advertisement

Next, the process of replaying a video without an advertisement will be described. As illustrated in FIG. 9, starting the process of replaying a movie picture without an advertisement, the controller 14 first acquires the video content VA from the content distribution apparatus 2 at the ordinary timing of acquisition to replay it (Step S301) and determines if the communication speed is equal to or greater than the threshold or not (Step S302).

Determining that the communication speed is not equal to or greater than the threshold (Step S302, No), the controller 14 proceeds with the process to Step S304. Contrarily, determining that the communication speed is equal to or greater than the threshold (Step S302, Yes), the controller 14 acquires the video content VA from the content distribution apparatus 2 at the timing of advance acquisition to replay it (Step S303) and then proceeds with the process to Step S304.

At Step S304, the controller 14 determines if the replaying the video content VA is completed or not. The controller 14 determines that the replaying the video content VA is completed when the controller 14 has replayed the video content VA to its end or when, in the course of replaying the video content VA, the controller 14 receives a signal input from the operation unit 13 and indicating that the user has operated it to terminate the replaying.

Determining that the replaying the video content VA is not completed (Step S304, No), the controller 14 proceeds with the process to Step S301. Contrarily, when it determines that the replaying the video content VA is completed (Step S304, Yes), the controller 14 terminates the process.

5.4. Page Display Process

Next, the page display process executed by the controller 14 will be described. As illustrated in FIG. 10, starting the page display process, the controller 14 first acquires the web page 41 from the content distribution apparatus 2 to cause the display 12 to display it (Step S401).

After that, the controller 14 acquires information on the visible zone that indicates a position of the visible zone 43 in the web page 41 (Step S402) and determines if the visible zone 43 contains the advertisement frame 42 or not (Step S403).

Determining that the visible zone 43 does not contain the advertisement frame 42 (Step S403, No), the controller 14 determines if a distance between the visible zone 43 and the advertisement frame 42 is equal to or smaller than the distance threshold (Step S408).

Determining that the distance from the visible zone 43 to the advertisement frame 42 is not equal to or smaller than the distance threshold (Step S408, No), the controller 14 proceeds with the process to Step S407. Contrarily, determining that the distance between the visible zone 43 and the advertisement frame 42 is equal to or smaller than the distance threshold (Step S408, Yes), the controller 14 determines if the communication speed is equal to or greater than the communication speed threshold or not (Step S409).

Determining that the communication speed is not equal to or greater than the threshold (Step S409, No), the controller 14 proceeds with the process to Step S407. Contrarily, determining that the communication speed is equal to or greater than the threshold (Step S409, Yes), the control unit 14 determines the time as the timing of advance acquisition of the advertisement CM and acquires the advertisement CM in advance from the advertisement distribution apparatus 3 (Step S410).

After that, the controller 14 determines if the acquisition of the advertisement CM is completed or not (Step S411). Determining that the acquisition of the advertisement CM is completed (Step S411, Yes), the controller 14 proceeds with the process to Step S407. Contrarily, determining that the acquisition of the advertisement CM is not completed (Step S411, No), the controller 14 proceeds with the process to Step S402.

Determining, at Step S403, that the visible zone 43 contains the advertisement frame 42 (Step S403, Yes), the controller 14 determines if it has acquired the advertisement CM in advance or not (Step S404).

Determining that it has not acquired the advertisement CM in advance (Step S404, No), the controller 14 acquires the advertisement CM from the content distribution apparatus 2 (Step S405) and proceeds with the process to Step S406. Contrarily, determining that it has acquired the advertisement CM (Step S404, Yes), the controller 14 proceeds with the process to Step S406.

At Step S406, the controller 14 replays the advertisement CM and thereafter determines if the display of the web page 41 is completed or not (Step S407). The controller 14 determines that the display of the web page 41 is completed when it receives a signal input from the operation unit 13 and indicating that the user has operated the controller 14 to terminate the display.

Determining that the display of the web page 41 is not completed (Step S407, No), the controller 14 proceeds with the process to Step S402. Contrarily, determining that the display of the web page 41 is completed (Step S407, Yes), the controller 14 terminates the process.

6. HARDWARE CONFIGURATION

Figure 11:
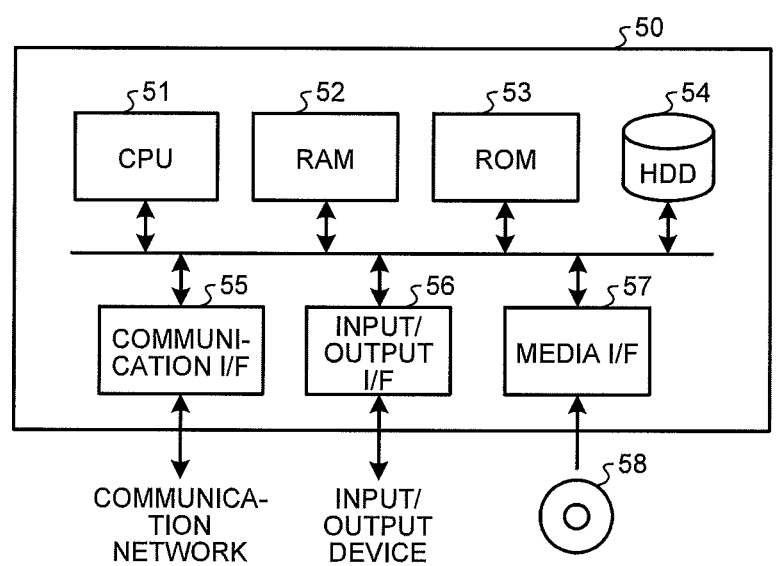
FIG. 11 is a hardware configuration diagram illustrating an example of a computer that implements functions of the information processing apparatus according to the embodiment.

The information processing apparatus 1 in the embodiment is implemented by a computer 50, for example, configured as illustrated in FIG. 11. FIG. 11 is a hardware configuration diagram illustrating an example of the computer that implements functions of the information processing apparatus 1 according to the embodiment. The computer 50 includes a CPU (Central Processing Unit) 51, a RAM (Random Access Memory) 52, ROM (Read Only Memory) 53, an HDD (Hard Disk Drive) 54, a communication interface (I/F) 55, an input/output interface (I/F) 56, and a media interface (I/F) 57.

The CPU 51 operates based upon programs stored in the ROM 53 or the HDD 54 to control components. The ROM 53 stores a boot program executed by the CPU 51 upon starting up the computer 50, programs depending on hardware of the computer 50, and so forth.

The HDD 54 stores programs executed by the CPU 51, data used by such programs, and so forth. The communication interface 55, which corresponds to the communication unit 11, receives data from other instruments via the communication network N and forwards them to the CPU 51, and the communication interface 55 sends data produced by the CPU 51 to the instruments via the communication network N.

The CPU 51 controls output apparatuses such as a display, a printer, and the like, and input apparatuses such as a keyboard, a mouse, and the like via the input/output interface 56. The CPU 51 acquires data from the input apparatuses via the input/output interface 56. The CPU 51 outputs the produced data to the output apparatuses via the input/output interface 56.

The media interface 57 reads programs or data stored in a record medium 58 and provides them to the CPU 51 via the RAM 52. The CPU 51 loads the RAM 52 with such programs from the record medium 58 via the media interface 57 and executes the loaded programs. The record medium 58 is, for example, an optical record medium such as a DVD (Digital Versatile Disc), a PD (Phase change rewritable Disk), or the like, an opto-magnetical record medium such as an MO (Magneto-Optical disk) or the like, a tape medium, a magnetic record medium, a semiconductor memory, or the like.

When the computer 50 functions as the information processing apparatus 1, the CPU 51 of the computer 50 functions as the display control unit 20, the content acquisition unit 21, the speed information acquisition unit 22, the determination unit 24, and the visible zone information acquisition unit 23 by executing the programs loaded in the RAM 52. Additionally, the HDD 54 implements the function of the memory 15 and stores the information processing program 25.

The CPU 51 of the computer 50 reads these programs from the record medium 58 to execute them, and alternatively, it may acquire these programs from other apparatus via the communication network N.

For example, when the information processing apparatus 1 is a user terminal apparatus that a user operates, the CPU 51 of the computer 50 configured to be the user terminal apparatus may acquire the information processing program 25 illustrated in FIG. 3 from the content distribution apparatus 2 or the advertisement distribution apparatus 3 via the communication network N.

In such a situation, the content distribution apparatus 2 or the advertisement distribution apparatus 3 is configured to have a distribution unit that distributes to the user terminal apparatus a control program illustrated in FIGS. 5A and 5B and including the information processing program for controlling contents displayed on the user terminal apparatus.

Then, the control program distributed by the distribution unit to the user terminal apparatus causes the user terminal apparatus to execute a speed information acquisition procedure for acquiring information on the communication speed between the user terminal apparatus and the distribution apparatus distributing a video content, a determination procedure for determining the timing of advance acquisition of the video content from the distribution apparatus based upon the information on the communication speed acquired in the speed information acquisition procedure, and a content acquisition procedure for acquiring the video content from the distribution apparatus at the timing of advance acquisition determined in the determination procedure.

With such a configuration, the video content can be normally replayed by the user terminal apparatus, regardless of the communication environment.

7. EFFECTS

As mentioned above, the information processing apparatus according to the embodiment includes a speed information acquisition unit, a determination unit, and a content acquisition unit. The speed information acquisition unit acquires information on a communication speed between the information processing apparatus and the distribution apparatus distributing a video content. The determination unit determines timing of advance acquisition of the video content from the distribution apparatus based upon the information on the communication speed acquired by the speed information acquisition unit. The content acquisition unit acquires the video content from the distribution apparatus at the timing of advance acquisition determined by the determination unit.

In this manner, the information processing apparatus acquires the video content at the timing of advance acquisition according to the communication speed, and thereby, the video content can be normally replayed regardless of the communication environment.

The video content according to the embodiment contains a primary content and an advertisement content that are replayed time-serially, and the determination unit determines timing of replay of the primary content as the timing of advance acquisition of the advertisement content.

In this manner, while replaying the primary content, the information processing apparatus can conduct advance acquisition of the advertisement content to replay later, and thereby, it can normally replay the advertisement content already acquired at the point of time when the advertisement content is replayed, regardless of the communication environment.

Additionally, while acquiring the primary content, the content acquisition unit according to the embodiment acquires an introductory portion of the advertisement content in advance. In this manner, the information processing apparatus according to the embodiment can normally replay the introductory portion of the advertisement content already acquired at the point of time of replaying the advertisement content, and can acquire the un-acquired remaining of the advertisement content while replaying the introductory portion. Thus, the information processing apparatus can normally replay the advertisement content, regardless of the communication environment.

The video content acquired by the information processing apparatus may be an advertisement content interpolated in a page, and the information processing apparatus according to the embodiment includes a display that displays the page. The determination unit determines, as the timing of advance acquisition of the advertisement content, timing at which a display zone for the advertisement content is not contained in a zone displayed on the display in the entire zone of the page.

In this manner, the information processing apparatus according to the embodiment can acquire in advance the advertisement content during a period of time when the display zone of the advertisement content is not contained in the zone displayed on the display. Thus, when the display zone of the advertisement content is contained in the zone displayed on the display, the information processing apparatus can normally replay the advertisement content, regardless of the communication environment.

Also, the determination unit according to the embodiment determines the timing of advance acquisition of the advertisement content based upon a distance between the zone displayed on the display of all over the page and the display zone of the advertisement content.

In this manner, when the distance between the zone displayed on the display of all over the page and the display zone of the advertisement content is relatively so great as the advertisement content is likely not to be browsed, the information processing apparatus can refrain from acquiring the needless advertisement content.

Also, when the distance between the zone displayed on the display of all over the page and the display zone of the advertisement content is relatively so small as the advertisement content is likely to be browsed, the information processing apparatus can acquire the advertisement content in advance of replaying the advertisement content if the communication speed is relatively high. Thus, when the display zone of the advertisement content is contained in the zone displayed on the display, the information processing apparatus can normally replay the advertisement content, regardless of the communication environment.

8. ADDITIONAL REMARKS

So far, some of the embodiments of the application have been described in detail in conjunction with the accompanying drawings, merely by way of example, and the invention can be embodied not only in the modes described in the disclosure of the invention but also in other modes variously modified and improved based upon the knowledge of a person having ordinary skills in the art.

The aforementioned information processing apparatus 1 has its configuration flexibly modified; for example, it may be implemented by a plurality of server computers, or otherwise, some of its features may be implemented by adopting an API (Application Programming Interface) or network computing to invoke an external platform or the like.

According to an aspect of the embodiment, it is possible to provide an information processing apparatus, an information processing method, a non-transitory computer readable storage medium having stored therein an information processing program, and a distribution apparatus, in which video contents can be normally replayed regardless of communication environment.

What is claimed is:

1. An information processing apparatus comprising:
   a memory storing a program; and
   a processor that executes the program to perform operations comprising:
   determining a communication speed between the information processing apparatus and a distribution apparatus by detecting an amount of currently-acquired video content acquired during a predetermined time;
   determining timing of advance acquisition of a video content from the distribution apparatus before playback of any of the video content based upon a time when the determined communication speed becomes larger than a playback speed of currently-acquired video content; and
   acquiring the video content in advance of playback of any of the video content from the distribution apparatus at the determined timing of advance acquisition of the video content before playback of any of the video content when the determined communication speed is greater than the playback speed of the currently-acquired video content.

2. The information processing apparatus according to claim 1, wherein
   the currently acquired video content and the video content contain a primary content and an advertisement content that are replayed time-serially, and
   the determining operation determines timing of replay of the primary content as the timing of advance acquisition of the advertisement content.

3. The information processing apparatus according to claim 2, wherein the content acquiring operation acquires in advance an introductory portion of the advertisement content while acquiring the primary content.

4. The information processing apparatus according to claim 1, further comprising a display that displays a page, wherein
the video content is an advertisement content interpolated in the page, and
the determining operation determines, as the timing of advance acquisition of the advertisement content, timing at which a display zone for the advertisement content is not contained in a zone displayed on the display in a zone of the page.

5. The information processing apparatus according to claim 4, wherein the content acquiring operation acquires an introductory portion of the advertisement content in advance during a period of time when the display zone for the advertisement content is not contained in the zone displayed on the display in the zone of the page.

6. The information processing apparatus according to claim 4, wherein the determining operation determines the timing of advance acquisition of the advertisement content based upon a distance between the zone displayed on the display and the display zone for the advertisement content in the zone of the page.

7. An information processing method performed by a computer, the method comprising:
determining a communication speed between the computer and a distribution apparatus, by detecting an amount of currently-acquired video content acquired during a predetermined time;
determining timing of advance acquisition of a video content from the distribution apparatus before playback of any of the video content based upon a time when the determined communication speed becomes larger than a playback speed of currently-acquired video content; and
acquiring the video content in advance of playback of any of the video content from the distribution apparatus at the determined timing of advance acquisition of the video content before playback of any of the video content when the determined communication speed is greater than the playback speed of the currently-acquired video content.

8. A non-transitory computer readable storage medium having stored therein an information processing program, the program causing a computer to execute a process comprising:
determining a communication speed between the computer and a distribution apparatus, by detecting an amount of currently-acquired video content acquired during a predetermined time;
determining timing of advance acquisition of a video content from the distribution apparatus before playback of any of the video content based upon a time when the determined communication speed becomes larger than a playback speed of currently-acquired video content; and
acquiring the video content in advance of playback of any of the video content from the distribution apparatus at the determined timing of advance acquisition of the video content before playback of any of the video content when the determined communication speed is greater than the playback speed of the currently-acquired video content.

9. A distribution apparatus comprising a distribution unit that distributes to a user terminal apparatus a control program for controlling a content displayed on the user terminal apparatus,
the control program causing the user terminal apparatus to execute a process comprising:
determining a communication speed between the computer and a distribution apparatus, by detecting an amount of currently-acquired video content acquired during a predetermined time;
determining timing of advance acquisition of a video content from the distribution apparatus before playback of any of the video content based upon a time when the determined communication speed becomes larger than a playback speed of currently-acquired video content; and
acquiring the video content in advance of playback of any of the video content from the distribution apparatus at the determined timing of advance acquisition of the video content before playback of any of the video content when the determined communication speed is greater than the playback speed of the currently-acquired video content.

* * * * *